US012636968B2

(12) United States Patent
Shin

(10) Patent No.: US 12,636,968 B2
(45) Date of Patent: May 26, 2026

(54) BOOTSTRAP METHOD OF ELECTRIC VEHICLE CHARGING STATION

(71) Applicants: Hyundai Motor Company, Seoul (KR); Kia Corporation, Seoul (KR); Myongji University Industry and Academia Cooperation Foundation, Yongin (KR)

(72) Inventor: Min Ho Shin, Yongin (KR)

(73) Assignees: Hyundai Motor Company, Seoul (KR); Kia Corporation, Seoul (KR); Myongji University Industry and Academia Cooperation Foundation, Yongin (KR)

( * ) Notice: Subject to any disclaimer, the term of this patent is extended or adjusted under 35 U.S.C. 154(b) by 950 days.

(21) Appl. No.: 17/797,949

(22) PCT Filed: Feb. 3, 2021

(86) PCT No.: PCT/KR2021/001436
§ 371 (c)(1),
(2) Date: Aug. 5, 2022

(87) PCT Pub. No.: WO2021/158020
PCT Pub. Date: Aug. 12, 2021

(65) Prior Publication Data
US 2023/0052150 A1     Feb. 16, 2023

Related U.S. Application Data

(60) Provisional application No. 62/970,788, filed on Feb. 6, 2020.

(51) Int. Cl.
*H02J 7/00* (2026.01)
*B60L 53/30* (2019.01)
(Continued)

(52) U.S. Cl.
CPC ............. *B60L 53/68* (2019.02); *B60L 53/305* (2019.02); *B60L 53/67* (2019.02); *G06F 9/4401* (2013.01)

(58) Field of Classification Search
CPC ........ B60L 53/68; B60L 53/67; B60L 53/305; G06F 9/4401
(Continued)

(56) References Cited

U.S. PATENT DOCUMENTS 9,026,347 B2     5/2015   Gadh et al.
10,057,243 B1 *  8/2018   Kumar ................. H04L 9/0891
(Continued)

FOREIGN PATENT DOCUMENTS

CN     105450623 A     3/2016
CN     109995701 A     7/2019
(Continued)

OTHER PUBLICATIONS

XP 9547976A, OCPP 2.0, Open Charge Alliance, Part 2—Specification, Apr. 2018, 410 pages.
(Continued)

*Primary Examiner* — Alexis B Pacheco
(74) *Attorney, Agent, or Firm* — Fox Rothschild LLP

(57) ABSTRACT

Provided is a bootstrap method for registering a charging station (CS), which was in an offline state, to an electric vehicle charging station management system (CSMS) and operating same. The bootstrap method comprises the steps of: storing at least partial bootstrap information in a CS so as to configure bootstrap information; connecting the CS to a CSMS by setting a security channel between the CS and the CSMS for maintaining registration information about the CS; and registering the CS to the CSMS.

20 Claims, 5 Drawing Sheets

(51) Int. Cl.
    *B60L 53/67*       (2019.01)
    *B60L 53/68*       (2019.01)
    *G06F 9/4401*     (2018.01)
    *H02J 7/14*        (2006.01)

(58) Field of Classification Search
    USPC ......................................................... 320/109
    See application file for complete search history.

(56) References Cited

U.S. PATENT DOCUMENTS

| | | | | |
|---|---|---|---|---|
| 2009/0313098 A1* | 12/2009 | Hafner | ................... | B60L 53/68 |
| | | | | 705/14.1 |
| 2010/0141203 A1* | 6/2010 | Graziano | ................ | B60L 53/18 |
| | | | | 320/109 |
| 2010/0211643 A1* | 8/2010 | Lowenthal | .............. | B60L 53/14 |
| | | | | 709/206 |
| 2011/0099144 A1* | 4/2011 | Levy | ........................ | B60L 53/30 |
| | | | | 709/227 |
| 2011/0239116 A1* | 9/2011 | Turner | ................... | B60L 53/65 |
| | | | | 715/810 |
| 2011/0246252 A1* | 10/2011 | Uesugi | ................... | G06Q 10/10 |
| | | | | 705/7.12 |
| 2013/0024306 A1* | 1/2013 | Shah | ........................ | B60L 53/65 |
| | | | | 705/17 |
| 2013/0110296 A1* | 5/2013 | Khoo | ...................... | G06Q 50/06 |
| | | | | 700/286 |
| 2014/0336832 A1* | 11/2014 | Kaneko | ................... | B60L 53/14 |
| | | | | 700/291 |
| 2014/0349614 A1 | 11/2014 | Starsinic et al. | | |
| 2015/0015419 A1 | 1/2015 | Halker et al. | | |
| 2017/0217319 A1* | 8/2017 | Araki | ..................... | B60L 53/122 |
| 2017/0250550 A1* | 8/2017 | Miftakhov | .............. | H02J 3/007 |
| 2018/0290553 A1* | 10/2018 | Malik | ..................... | B60L 53/00 |
| 2019/0016312 A1* | 1/2019 | Carlson | ................... | B60L 53/66 |
| 2020/0329013 A1 | 10/2020 | Zhou | | |
| 2021/0182831 A1 | 6/2021 | Gaddam et al. | | |
| 2022/0181887 A1* | 6/2022 | Baldasare | .......... | G07C 9/00912 |
| 2023/0353554 A1* | 11/2023 | Behera | ................... | B60L 53/68 |
| 2024/0239231 A1* | 7/2024 | Goei | ...................... | G06Q 30/08 |
| 2025/0050771 A1* | 2/2025 | Dicke | ..................... | B60L 53/37 |

FOREIGN PATENT DOCUMENTS

| | | |
|---|---|---|
| KR | 102031116 B1 | 10/2019 |
| WO | 2019/128982 A1 | 7/2019 |

OTHER PUBLICATIONS

Open Charge Point Interface 2.1.1, document version: 2.1.1-RC1, eco-movement.com, OCPI 2.1.1, https://github.com/ocpi, Jan. 15, 2017, 74 pages.

* cited by examiner

BOOTSTRAP METHOD OF ELECTRIC VEHICLE CHARGING STATION

CROSS-REFERENCE TO RELATED APPLICATIONS

The present application is a U.S. National Phase application under 35 U.S.C. § 371 of International application No. PCT/KR2021/001436 filed on Feb. 3, 2021, which claims under 35 U.S.C. § 119(e) the benefit of U.S. Provisional Application No. 62/970,788 filed on Feb. 6, 2020, the entire contents of which are incorporated by reference herein.

TECHNICAL FIELD

The present disclosure relates to a method of maintaining an electric vehicle charging device and, more particularly, to a method of bootstrapping a charging station. Also, the present disclosure relates to a charging station apparatus suitable for implementing the bootstrapping method.

BACKGROUND

An electric vehicle (EV) is driven by an electric motor powered by a battery and has advantages of reducing pollutants such as exhaust gas and noise, less breakdown, longer life, and simpler driving operation compared with a conventional combustion engine vehicle. An electric vehicle charging system may be defined as a system that charges a battery mounted in an electric vehicle using power obtained from a commercial power grid or stored in an energy storage device. Such an electric vehicle charging system may be implemented in various forms. For example, the electric vehicle charging system may include a conductive charging system using a cable for charging or a non-contact wireless power transfer system.

A charging station has one or more electric vehicle supply equipments (EVSEs) as a physical framework enabling the EV charging and supplies the electric power to a visiting EV via one of the EVSEs through the conductive charging or the wireless power transfer after a certain authentication process. In addition to supplying the electric energy to the EV, the charging station generally performs various tasks such as an authentication of the EV, an authorization of a transaction, obtaining a payment, and installation of a certificate and/or a program in the EV. The charging station may be a very complex system equipped with various programs and data since these tasks are performed based on various programs and protocol stacks and require wired or wireless communications based on a symmetric key or public key infrastructure (PKI). Besides, the charging station operates as a member of a charging network including a charging station operator (CSO) and a plurality of charging stations.

Because the charging station is a system having a complex configuration and operates based on the network, a well-defined bootstrapping procedure is required when a new charging station is added to the network, so that the newly added charging station is securely connected to the network and operates normally. Such a bootstrapping procedure is required also when the charging station is to be reconnected to the network after having undergone an off-line maintenance work because of a loss of credentials due to an expiration or revocation of a certificate or an erasure of contents in a storage. Though various EV-related industrial standards have been established and are being prepared, there is no standard prescribing the bootstrapping procedure for installing a new charging station or reinstalling the charging station having undergone the off-line maintenance work, which may lead to an instability of the electric vehicle charging system.

SUMMARY

To solve the problem above, the present disclosure provides a bootstrapping method for securely connecting a newly added charging station or a charging station having completed an off-line maintenance work to a network and enabling the charging station to operate normally.

Also, the present disclosure provides a charging station apparatus that may be registered with a predetermined charging station management system through a predetermined bootstrapping procedure to be operable to charge an electric vehicle.

According to an aspect of an exemplary embodiment, provided is a bootstrapping method for registering a charging station in an offline state with an electric vehicle charging station management system (CSMS) to enable the charging station to operate normally. The bootstrapping method includes: configuring bootstrap information by storing at least some of the bootstrap information in the charging station; establishing a secure channel between the charging station and the CSMS in which registration information for the charging station is to be maintained and connecting the charging station to the CSMS; and registering the charging station with the CSMS.

The bootstrap information may include: connection information to the CSMS associated with the charging station; credential information for establishing the secure channel to the CSMS; and registration information of the charging station.

The connection information may include at least one of an IP address and port number of the CSMS, and connection information needed to communicate with the CSMS according to a predetermined communication protocol.

The predetermined communication protocol may be an Extensible Messaging and Presence Protocol (XMPP), and the connection information needed to communicate with the CSMS may include an XMPP application identifier or subscription topics.

The credential information may include at least one of: a symmetric key shared in advance by the charging station and the CSMS or identification information that may be used to check a physical or logical identity of the charging station; and a public key certificate chain including a public key issued to the charging station.

The operation of configuring the bootstrap information may be performed in at least one of three modes: a factory configuration mode in which the bootstrap information is stored in the charging station in a predetermined factory; an on-site configuration mode in which the bootstrap information is stored in the charging station in an installation site by using a storage medium; and a remote configuration mode in which the bootstrap information is stored in the charging station through a predetermined communication network from a bootstrapping server located in a remote site.

The operation of configuring the bootstrap information in the remote configuration mode may include: installing predetermined bootstrap trigger information in the charging station according to any of the factory configuration mode, the on-site configuration mode, and a combination thereof; and downloading the bootstrap information from the bootstrapping server based on the bootstrap trigger information installed in the charging station.

The operation of downloading the bootstrap information may include: establishing a secure channel between the charging station and the bootstrapping server in a same manner as establishing the secure channel between the charging station and the CSMS to register the registration information of the charging station.

The operation of establishing the secure channel between the charging station and the CSMS and connecting the charging station to the CSMS may include: establishing the secure channel by using a transport layer security-pre-shared key (TLS-PSK) cypher suite when a credential available to the charging station is a pre-shared symmetric key (PSK) shared with the CSMS, and establishing the secure channel by using a transport layer security method with mutual authentication or a certificate-based connection method when the credential available to the charging station is a predetermined certificate chain.

The operation of registering the charging station with the CSMS may include: transmitting the registration information including identity information of the charging station, identity information of an EVSE included in or connected to the charging station, and capability information of the charging station to the CSMS.

According to another aspect of an exemplary embodiment, provided is a charging station apparatus capable of being registered with a charging station management system (CSMS) through a predetermined bootstrapping procedure in an offline state to be operable to charge an electric vehicle. The charging station apparatus includes a processor and a memory storing program instructions to be executed by the processor. The program instructions, when executed by the processor, causes the processor to: configure bootstrap information by storing at least some of the bootstrap information in the memory; establish a secure channel to the CSMS in which registration information for the charging station apparatus is to be maintained and connect the charging station apparatus to the CSMS; and register the charging station apparatus with the CSMS.

The bootstrap information may include: connection information to the CSMS associated with the charging station apparatus; credential information for establishing the secure channel to the CSMS; and registration information of the charging station apparatus.

The connection information may include at least one of an IP address and port number of the CSMS, and connection information needed to communicate with the CSMS according to a predetermined communication protocol.

The predetermined communication protocol may be an Extensible Messaging and Presence Protocol (XMPP), and the connection information needed to communicate with the CSMS may include an XMPP application identifier or subscription topics.

The credential information may include at least one of: a symmetric key shared in advance by the charging station apparatus and the CSMS or identification information that may be used to check a physical or logical identity of the charging station apparatus; and a public key certificate chain including a public key issued to the charging station apparatus.

The program instructions causing the processor to configure the bootstrap may include instructions causing the processor to perform at least one of three modes: a factory configuration mode in which the bootstrap information is stored in the charging station apparatus in a predetermined factory; an on-site configuration mode in which the bootstrap information is stored in the charging station apparatus in an installation site by using a storage medium; and a remote configuration mode in which the bootstrap information is stored in the charging station apparatus through a predetermined communication network from a bootstrapping server located in a remote site.

The program instructions causing the processor to configure the bootstrap information in the remote configuration mode may include instructions causing the processor to: install predetermined bootstrap trigger information in the charging station according to any of the factory configuration mode, the on-site configuration mode, and a combination thereof; and download the bootstrap information from the bootstrapping server based on the bootstrap trigger information.

The program instructions causing the processor to download the bootstrap information may include instructions causing the processor to establish a secure channel to the bootstrapping server in a same manner as establishing the secure channel to the CSMS to register the registration information.

The program instructions causing the processor to establish the secure channel to the CSMS and connect the charging station apparatus to the CSMS may include instructions causing the processor to establish the secure channel by using a transport layer security-pre-shared key (TLS-PSK) cypher suite when an available credential is a pre-shared symmetric key (PSK) shared with the CSMS, and establish the secure channel by using a transport layer security method with mutual authentication or a certificate-based connection method when the available credential is a predetermined certificate chain.

The program instructions causing the processor to register the charging station apparatus with the CSMS may include instructions causing the processor to send the registration information including identity information of the charging station apparatus, identity information of an EVSE included in or connected to the charging station apparatus, and capability information of the charging station apparatus to the CSMS.

According to an exemplary embodiment of the present disclosure, a newly added charging station or a charging station having completed the maintenance work can be securely connected to the charging network to be operated normally. Thus, it is possible to maintain interoperability between the charging station and the charging station management system without causing an instability of the electric vehicle charging system due to the addition or reinstallation of the charging station.

BRIEF DESCRIPTION OF THE DRAWINGS

In order that the disclosure may be well understood, there will now be described various forms thereof, given by way of example, reference being made to the accompanying drawings, in which.

Figure 1:
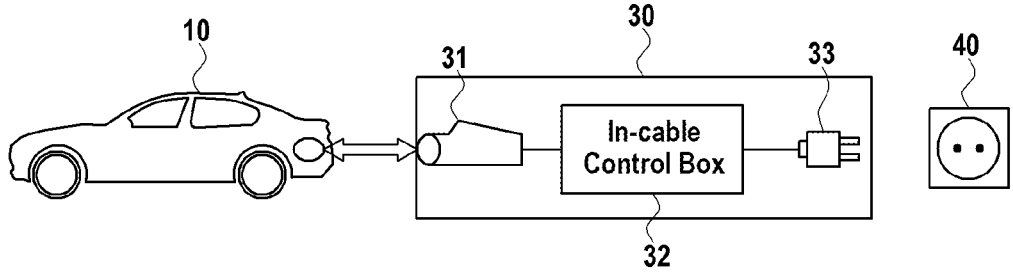
FIG. 1 is a conceptual diagram illustrating an EV conductive charging system to which an exemplary embodiment of the present disclosure may be applied.

The drawings described herein are for illustration purposes only and are not intended to limit the scope of the present disclosure in any way.

DETAILED DESCRIPTION

For a clearer understanding of the features and advantages of the present disclosure, exemplary embodiments of the present disclosure will be described in detail with reference to the accompanied drawings. However, it should be understood that the present disclosure is not limited to particular embodiments and includes all modifications, equivalents, and alternatives falling within the idea and scope of the present disclosure. In describing each drawing, similar reference numerals have been used for similar components.

The terminologies including ordinals such as "first" and "second" designated for explaining various components in this specification are used to discriminate a component from the other ones but are not intended to be limiting to a specific component. For example, a second component may be referred to as a first component and, similarly, a first component may also be referred to as a second component without departing from the scope of the present disclosure. The expression "and/or" may be used to refer to a combination of a plurality of listed items or any of the plurality of listed items.

When a component is referred to as being "connected" or "coupled" to another component, the component may be directly connected or coupled logically or physically to the other component or indirectly through an object therebetween. Contrarily, when a component is referred to as being "directly connected" or "directly coupled" to another component, it is to be understood that there is not an intervening object between the components.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless defined otherwise, all terms used herein, including technical or scientific terms, have the same meaning as commonly understood by those of ordinary skill in the art to which the present disclosure pertains. Terms such as those defined in a commonly used dictionary should be interpreted as having meanings consistent with meanings in the context of related technologies and should not be interpreted as having ideal or excessively formal meanings unless explicitly defined in the present application.

Terms used in the present disclosure are defined as follows.

"Electric Vehicle (EV)": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be a four or more wheeled vehicle manufactured for use primarily on public streets or roads. The EV may include an electric vehicle, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle (PEV)": An Electric Vehicle that recharges the on-vehicle primary battery by connecting to the power grid.

"Wireless power charging system (WCS)": A system for wireless power transfer and control of interactions including operations for an alignment and communications between a ground assembly (GA) and a vehicle assembly (VA).

"Wireless power transfer (WPT)": A transfer of electric power between a power source such as a utility and the power grid and the EV through a contactless channel.

"Interoperability": A state in which components of a system interwork with corresponding components of the system to perform operations aimed by the system. Additionally, information interoperability may refer to capability that two or more networks, systems, devices, applications, or components may efficiently share and easily use information without causing inconvenience to users.

"Inductive charging system": A system transferring energy from a power source to an EV via a two-part gapped core transformer in which the two halves of the transformer, i.e., primary and secondary coils, are physically separated from one another. In the present disclosure, the inductive charging system may correspond to an EV power transfer system.

"Charging station (CS)": A facility equipped with one or more electric vehicle supply equipments (EVSEs) and physically performing the charging to the EVs.

"Charging station operator (CSO)": A party responsible for the provisioning and operation of a charging infrastructure and managing electricity to provide a requested energy transfer service. The charging station operator may be a term having a same concept as a charge point operator (CPO).

"Charge Station Management System (CSMS)": An entity responsible for maintaining registries of one or more charging stations and manages the charging stations, in particular the EVSEs, in terms of system updates such as a firmware update.

"Charge Service Provider (CSP)": An entity managing and authenticating EV user's credentials and providing the billing and other value-added services to customers. The CSP may be considered as a special type of a mobility operator (MO) and may be integrated with the MO.

"Clearing House (CH)": An entity handling cooperation between the MOs, CSPs, and CSOs. In particular, the clearing house may perform a role of an intermediate actor facilitating an authorization, billing, and settling procedure for the EV charging service roaming, between two clearing parties.

"Credential": A physical or digital asset representing an identity of an EV or EV owner, and may include a password used to verify the identity, a public key and private key pair used in a public key encryption algorithm, a public key certificate issued by a certification authority, information related to a trusted root certification authority.

"Certificate": An electronic document binding a public key to an ID by a digital signature.

"Physical identity": A permanent identity of a device or its component that is unique and does not change over its lifetime. Examples of the physical identity may include manufacture ID and a serial number of a device or a vehicle.

"Logical identity": An operational identity of a device or its component that is unique but can change when operational changes occur such as migration to a different operator. Examples of the logical identity may include an ID of the EVSE (EVSEID) and an ID of a supply equipment communication controller (SECCID).

"Secure channel": A communication channel between entities having security properties of confidentiality, integrity, and authenticity.

Exemplary embodiments of the present disclosure will now be described in detail with reference to the accompanying drawings.

Figure 2:
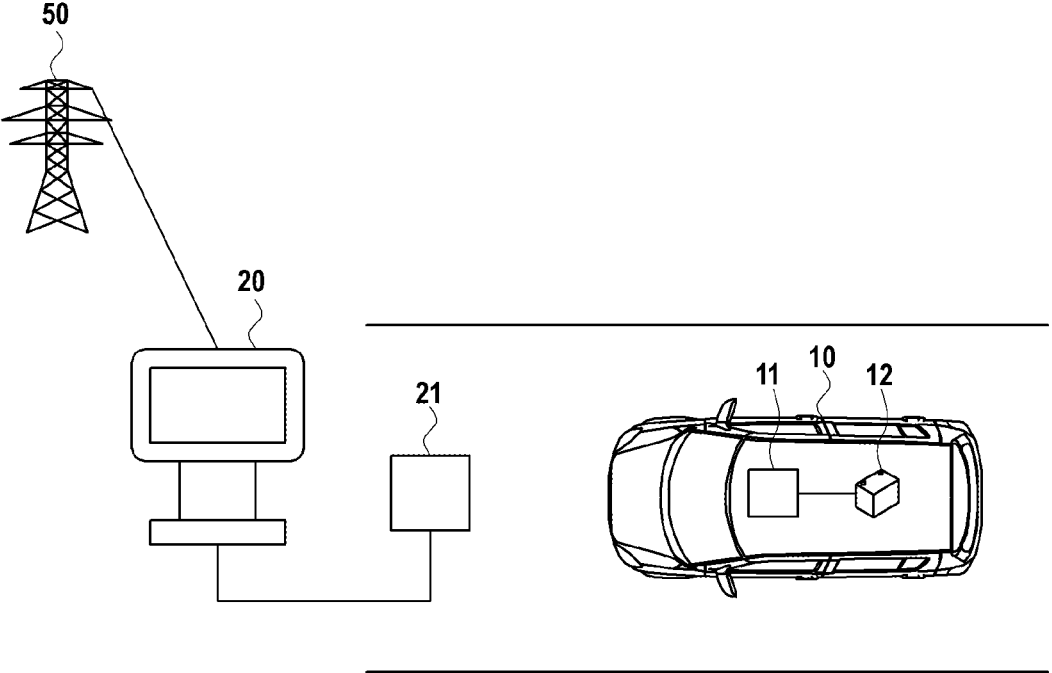
FIG. 2 is a conceptual diagram illustrating a wireless power transfer (WPT) system to which an exemplary embodiment of the present disclosure may be applied.

In an electric vehicle charging system for implementing the present disclosure, an electric vehicle (EV) may be connected to a charging station through a wired or wireless link to receive energy from the charging station and charge an energy storage device such as a battery with the supplied energy. FIGS. 1 and 2 show a method of charging an electric vehicle by a conductive charging and a wireless power transfer, respectively.

FIG. 1 is a conceptual diagram illustrating an electric vehicle conductive charging system to which an exemplary embodiment of the present disclosure may be applied. The electric vehicle conductive charging may be performed by connecting the electric vehicle (hereinafter referred to as 'EV') to a power supply circuit of a charging station by a charging cable 30, e.g. by connecting a cable connector of the charging station 20 to an inlet of the EV 10.

The EV 10 may be generally defined as an automobile driven by an electric motor that is powered by a rechargeable energy storage device such as a battery mounted on the EV 10. The EV 10 may be a hybrid electric vehicle (HEV) having the electric motor as well as an internal combustion engine. Also, the EV 10 is not limited to an automobile but may also be a motorcycle, a cart, a scooter, or an electric bicycle.

The EV 10 may include a plug inlet or a receptacle that may be coupled with a connector of a charging cable 30. The plug inlet provided in the EV 10 may support a slow charging or a rapid charging. Here, the EV 10 may include either a single inlet that supports both of the slow charging and the rapid charging through a single plug connection, or a plurality of inlets that respectively support the slow charging and the rapid charging.

The EV 10 may further include an on-board charger to support the slow charging or a charging that uses an alternating current (AC) power supplied from the power grid system. The on-board charger may boost a level of the AC power supplied from the power grid system and convert into a direct current (DC) power to supply the DC power to the battery of the EV 10 during the course of the slow charging. Contrarily, in case the DC power is supplied to the inlet of the EV 10 for the rapid charging, the DC power may be supplied to the battery without an intervention of the on-board charger.

The EV charging cable 30 may include at least one of a charging plug 31, an in-cable control box (ICCB) 32, and a wall jack plug 33. The charging plug 31 may be a connection part that can be electrically connected to the inlet of the EV 10. The ICCB 32 may communicate with the EV 10 to receive status information of the EV or to control the electric power charging of the EV 10. Although the ICCB 32 is illustrated as being included in the EV charging cable 30, the ICCB 32 may be installed in a place other than the EV charging cable 10, e.g., in a power supply circuit in the charging station or may be connected to the power supply circuit. The wall jack plug 33 may include an electrical connection member such as a general plug or a cord set and allows the charging cable 30 to be connected to a wall jack or an outlet of the charging stand to receive the power.

Meanwhile, a wall jack 40 may refer to a connection point between the charging stand of the charging station and the charging connector 31. However, the present disclosure is not limited thereto, and the wall jack 40 may refer to another kind of connection point between the charging device installed in another place and the charging connector 31. For example, the wall jack 40 may be installed at a commercial dedicated charging station facility as well as at various places such as a parking lot of the EV owner's house, a parking lot allocated for the EV charging at a gas station, and a parking area at a shopping center or an office building, for example.

FIG. 2 is a conceptual diagram illustrating a wireless power transfer (WPT) system to which an exemplary embodiment of the present disclosure may be applied.

The wireless power transfer (WPT) for an EV can be defined as a transfer of electrical energy from a supplier device to a consumer device through a magnetic field in a magnetic resonance condition without a current flow through a galvanic connection. The wireless power transfer may be used to charge the EV 10 by transmitting the electric power from the charging station 20 to the EV 10.

As shown in FIG. 2, the WPT may be performed by at least one component of the EV 10 and the charging station 20 and to transfer the electric power to the EV 10 without any conductive wire.

The EV 10 may include a power reception pad 11 having a reception coil suitable for receiving the magnetic energy from the charging station 20 wirelessly. The reception coil at the power reception pad 11 receives the magnetic energy from a transmission coil of a power transmission pad 21 at the charging station 20, for example, by the magnetic resonance. The magnetic energy received by the EV 10 is converted into an induced current, which is rectified into a DC current to charge the battery 12.

The charging station 20 may receive the electric power from the power grid 50 or the power backbone, and may supply the energy to the EV 10 through the transmission pad 21. The transmission pad 21 has the transmission coil, which may generate magnetic flux and supply the magnetic energy amplified by the magnetic resonance to the EV 10. The charging station 20 may be located in various places such as the parking lot of the EV owner's house, the parking lot allocated for the EV charging at a gas station, and the parking area at a shopping center or an office building, for example.

The charging station 20 may communicate with a power infrastructure management system or an infrastructure server that manages the power grid 50 through wired or wireless communications. Also, the charging station 20 may perform the wireless communications with the EV 10. Here, the wireless communications may include a wireless LAN (WLAN) based on Wi-Fi according to the IEEE 802.11 protocol or a P2PS communications using a low frequency (LF) magnetic field signal and/or a low power excitation (LPE) magnetic field signal. In addition, the wireless communications between the charging station 20 and the EV 10 may include one or more of various communication schemes such as Bluetooth, Zigbee, and cellular communications.

Meanwhile, according to ISO 15118 industrial standard which is a communication standard for the EV charging, the EV and the charging station may exchange messages to control the overall charging process. That is, communications for charging the EV may be performed between an EV communication controller (EVCC) and a supply equipment communication controller (SECC) through the wireless LAN.

During the communication process, the EV first authenticates the charging station to ensure that the charging station is trustworthy, and establishes a secure channel with the charging station to protect the communications from an unauthorized access. These operations may be achieved according to a standardized Transport Layer Security (TLS) protocol defined in RFC 5246 produced by TLS working group, Internet Engineering Task force (IETF). A TLS session may be established by a TLS session establishment procedure after an establishment of an IP-based communication connection.

Figure 3:
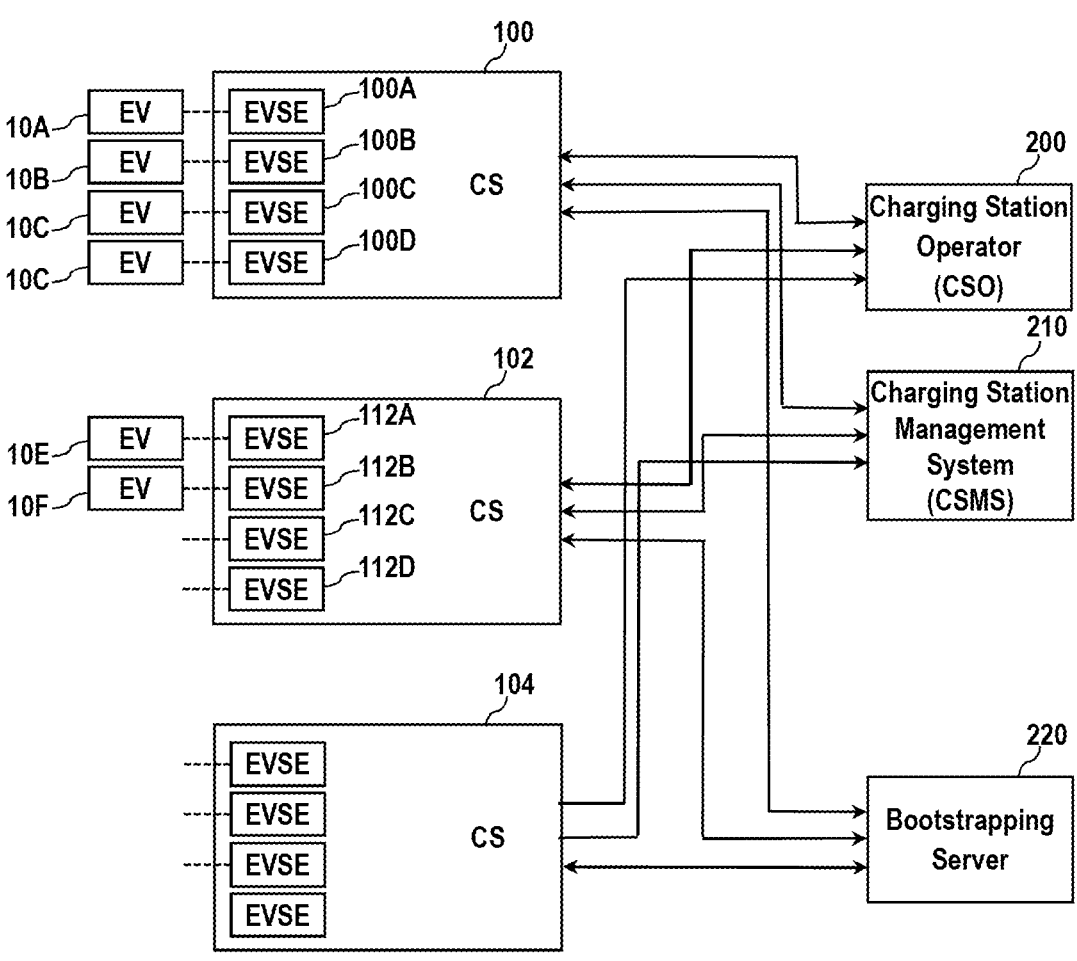
FIG. 3 is a block diagram of a front end part of an EV charging infrastructure system according to an exemplary embodiment of the present disclosure.

FIG. 3 is a block diagram of a front end part of an EV charging infrastructure system according to an exemplary embodiment of the present disclosure.

The EV charging infrastructure system provides a charging service to the EV 10 and includes at least one charging station (CS) 100-104, a charging station operator (CSO), and a charging station management system (CSMS) 210. Both the CSO and the CSMS may be connected to the charging stations 100-104. In addition, the EV charging infrastructure system shown in the drawing includes a bootstrapping server 220 supporting a bootstrapping of the charging stations 100-104.

Electric vehicles (EVs) 10A-10F are illustrated together in FIG. 3 for convenience of description. Each of the EVs 10A-10F may refer to a general electric vehicle owned by an EV owner, may be a hybrid electric vehicle (HEV) having the electric motor as well as the internal combustion engine, or may be a motorcycle, a cart, a scooter, or an electric bicycle. The EVs 10A-10F may be charged by the conductive charging or the wireless power transfer in the charging stations 100-104.

The charging stations 100-104 actually perform the charging for the EVs 10A-10F. Each of the charging stations 100-104 is provided with a plurality of EV supply equipment (EVSE) 100A-112D. For example, the charging station 100 is equipped with a plurality of EVSEs 100A-100D, and the charging station 102 is equipped with a plurality of EVSEs 112A-112D. Each of the EVSEs 100A-112D may be provided with at least one conductive charger and/or a wireless charging spot to supply the electric power to one or more EVs 10A-10F. Each of the charging stations 100-104 may be installed in a dedicated commercial charging area. Also, each of the charging stations 100-104 may be installed at various places such as the parking lot of the EV owner's house, the parking lot allocated for the EV charging at a gas station, and the parking area at a shopping center or an office building, for example. The charging station may also be referred to as a 'charging point', 'EV charging station', 'electric charging point', 'electronic charging station (ECS)', or 'EV supply equipment (EVSE)'.

A charging station operator (CSO) 200 or a charge point operator (CPO) provides and operates the charging station and manages electricity to provide a requested energy transfer service. The CSO 200 may be operated by a charging station manufacturer or an electricity provider, for example.

A charging station management system (CSMS) 210 maintains a registry of the charging stations 100-104 and manages the charging stations 100-104, in particular the EVSEs 100A-112D, in terms of system updates such as a firmware update. The CSMS 210 may be regarded as a centralized operating software executed in any of the CSOs 200 managing the charging stations 100-104. However, the present disclosure is not limited thereto, and the CSMS 210 may be mounted on and operated in a separate hardware. Also, the CSMS 210 may have additional functionalities beyond those of the CSO's operating software.

The bootstrapping server 220 provides the charging stations 100-104 with bootstrap information required by the charging stations 100-104. When a secure channel is established between the bootstrapping server 220 and one of the charging stations 100-104 in a state that bootstrap trigger information which is the minimum information required for the bootstrapping is stored in the charging station, the bootstrapping server 220 provides the rest of the information required for the bootstrapping to the charging station, so that the bootstrap information is installed in the CS 100-104.

Figure 4:
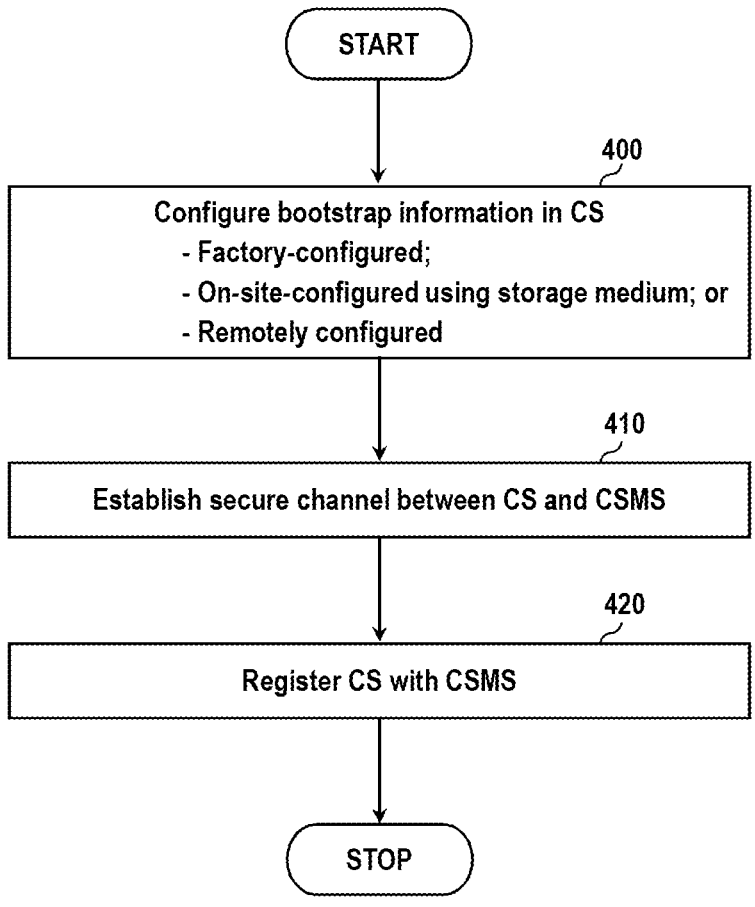
FIG. 4 is a flowchart illustrating a bootstrapping method according to an exemplary embodiment of the present disclosure.

FIG. 4 is a flowchart illustrating a bootstrapping method according to an exemplary embodiment of the present disclosure.

The term 'bootstrapping' as used herein refers to a process of installing and provisioning a new charging station that is added to a charging network to facilitate a secure access to the charging network and the operation of the newly added charging station. The bootstrapping procedure may also be a procedure of reinstalling and provisioning of the charging station, after a large-scale maintenance work, which has been offline caused by an unrecoverable problem such as a loss of credentials due to an expiration or revocation of a certificate or an erasure of contents in a storage. Hereinbelow, it is assumed in FIG. 3 that the charging station 102 is a reinstalled device and the charging station 104 is a newly added device, for example.

Referring to FIG. 4, the bootstrapping method according to an exemplary embodiment of the present disclosure includes an operation of configuring the bootstrap information by storing some bootstrap information in the charging station 102 or 104 (operation 400), an operation of establishing a secure channel between the CSMS 210 and the charging station 102 or 104 to connect the charging station 102 or 104 to the CSMS 210 (operation 410), and registering the charging station 102 or 104 with the CSMS 210 (operation 420).

Here, the secure channel refers to a communication channel between entities having security properties of confidentiality, integrity, and authenticity. The confidentiality refers to the property that nobody other than the communicating parties can read the message. The integrity refers to the property that nobody can modify or forge the message. The authenticity refers to the property of enabling to authenticate whether the origin of the message is correct and whether the message content is trustworthy.

In the operation 400, at least some of the bootstrap information is stored in the charging station 102 or 104 to be installed or reinstalled, so that the charging station 102 or 104 can use the stored bootstrap information. The term 'bootstrapping information' as used herein refers to information required by the charging station 102 or 104 to get securely bootstrapped in the charging network, and may include connection information to the CSMS 210 associated with the charging station, and credential information for establishing the secure channel to the CSMS 210, and registration information of the charging station 102 or 104.

The connection information to the CSMS 210 associated with the charging station may include at least one of an IP address and port number of the CSMS 210, and connection information needed to communicate with the CSMS 210 according to a predetermined communication protocol. Here, the predetermined communication protocol may include Extensible Messaging and Presence Protocol (XMPP). In such a case, the connection information needed to communicate with the CSMS 210 may be an XMPP application identifier and/or subscription topics.

The credential information for establishing the secure channel to the CSMS 210 may include a symmetric key shared in advance by the charging station 102 or 104 and the CSMS 210 or identification information (ID) that may be used to check a physical or logical identity of the charging station 102 or 104. The credential information may include a public key paired with a private key of the charging station 102 or 104, a public key certificate for the public key, or a certificate chain. The certificate chain may include a provisioning certificate chain. The provisioning certificate may be a certificate for a one-time authentication through the CSMS 210. After the one-time authentication using the provisioning certificate is completed, a CS leaf certificate may be issued and installed in the charging station 102 or 104, so that the CS leaf certificate may be used for subsequent normal authentication processes. Alternatively, the certificate chain may include a CSO RootCA certificate and a certificate issued by the CSO 200. In addition, the credential information may include authentication information that may be input manually such as an ID and password or another authentication code.

The physical identity may refer to a permanent identity of a device or its component that is universally unique and does not change over its lifetime. Examples of the physical identity include a manufacturer ID and a serial number of the device or a vehicle. On the other hand, the logical identity is an operational ID of a device or its component that is universally unique but can be changed when an operational change such as a migration to another operator occurs. Examples of the logical identities include an EVSEID which is an identifier of each of the EVSEs 100A-100F and a SECCID which is an identifier of each supply equipment communication controller (SECC) included in the EVSEs 100A-100F and capable of communicating with the EV 10A-10F through the wireless LAN (WLAN), for example.

Meanwhile, the registration information may include information needed by the CSMS 210 to operate and manage the charging stations 102 and 104.

In addition, the registration information may include the physical and logical identity information of the charging stations 102 and 104. Examples of the physical identity information of the charging stations 102 and 104 may include the manufacturer ID and the serial number of the device, and examples of the logical identity information of charging stations 102 and 104 of the logical identities may include the identifier of the SECC, i.e. SECCID.

Further, the registration information may include the physical identification information, e.g., the serial number, or the logical identification information, e.g., the EVSEID, of the EVSEs in the charging stations 102 and 104.

The registration information may further include information on capabilities of the charging stations 102 and 104. The capability information may include one or more of a product model ID, a set of operation mode attributes, e.g., AC, DC, WPT, BPT, dynamic, ACD, etc., and a set of capabilities of each EVSE.

The registration information may further include any other information relevant to the operation of the charging station 102 and 104 or the CSMS 210.

The method of storing the bootstrap information in the charging station 102 or 104 to configure the bootstrap information in the operation 400 may be categorized into three modes: a factory configuration mode, an on-site configuration mode using a storage medium, and a remote configuration mode.

In the factory configuration mode, the bootstrap information is stored in the charging station 102 or 104 in a factory or service center before the charging station is deployed on its site. This configuration mode has advantages of being easy to install and scalable. On the other hand, this configuration mode is inflexible and may incur high system maintenance costs in case that the charging station is bootstrapped in this mode whenever a failure occurs.

According to the on-site configuration mode, the bootstrap information may be stored in the charging station 102 or 104 in its site by using a storage medium such as a smart card, USB stick, or SDCard while the charging station 102 or 104 is installed or reinstalled on its site. In other words, the bootstrap information copied from the storage medium is stored into the charging station 102 or 104 on its site. To secure a system stability, it may be impossible or very hard for an operator to manually input the bootstrap information directly into the charging station 102 or 104 during the on-site configuration mode. The deployment of the charging station in this configuration mode may be expensive. Also, the flexibility and the maintenance cost of this mode may be in medium ranges, and the scalability may not be so high.

According to the remote configuration mode, bootstrapping trigger information (BTI) is first installed in the charging station 102 or 104 by the factory configuration mode, the on-site configuration mode, the on-site manual configuration mode, or a combination thereof, and then a full bootstrap information is downloaded from the bootstrapping server based on the bootstrap trigger information. The bootstrap trigger information (BTI) may include the connection information to the bootstrapping server, the physical and/or logical identity information of the charging station 102 or 104, and credential information for a secure connection. In case that multiple bootstrapping server information is available, a next server may be selected whenever a downloading from a bootstrapping server is successful. Since the process of establishing a secure connection to the bootstrapping server is the same as the establishment process described below, a description thereof will be omitted for simplicity. This configuration mode is the most flexible in its implementation and is cost-effective. However, this mode may have a limitation that it must be combined with another configuration mode.

The operation 410 of establishing the secure channel between the charging station 102 or 104 and the CSMS 210 to connect the charging station 102 or 104 to the CSMS 210 in FIG. 4 may differ depending on a type of credential information stored in the charging station 102 or 104. Accordingly, when a secure channel is to be established by a certain cipher suite, credential information needed for the cipher suite has to be stored in the charging station 102 or 104.

When the credential available to the charging station 102 or 104 is a pre-shared key (PSK) that is shared with the CSMS 210, the charging station 102 or 104 uses one of the following transport layer security-pre-shared key (TLS-PSK) methods to establish the secure channel.

TLS with PSK cipher-suites defined in RFC 4279 or RFC5478

TLS with DHE-with-PSK cipher-suites as defined in RFC 4279 or RFC5478

TLS with ECDHE-with-PSK cipher-suites as defined in RFC 5489

TLS with server-certificate-client-PSK cipher-suites in RFC 4279 or RFC5478

Any PSK-based connection method provided by the XMPP protocol

Figure 5:
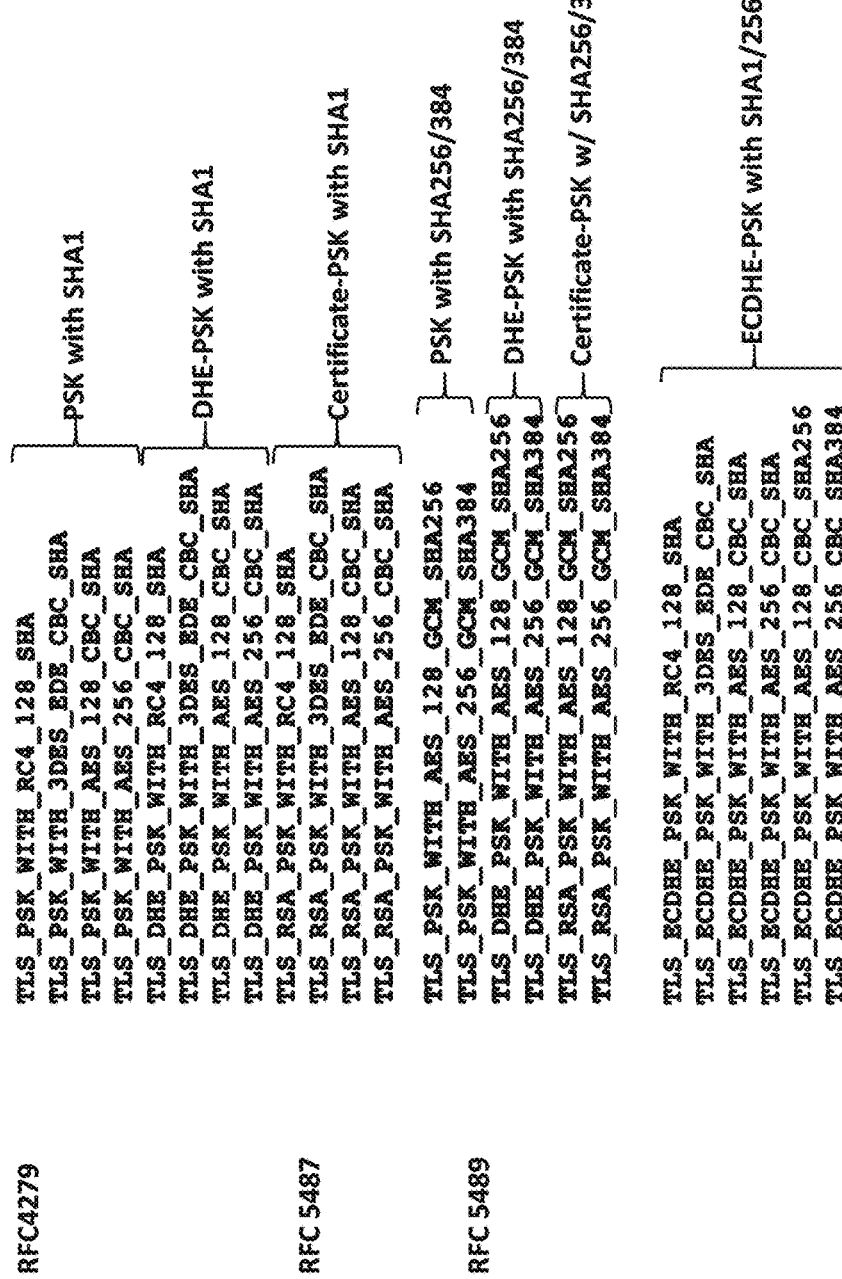
FIG. 5 shows examples of TLS-PSK cipher suites available for an establishment of a secure channel.

FIG. 5 shows examples of available TLS-PSK cipher suites.

In case that the credentials available to charging station 102 or 104 are a certificate chain issued by CSO PKI and CSO RootCA certificate, the charging station 102 or 104 uses TLS 1.2 with mutual authentication or any certificate-based connection method provided by the XMPP protocol. In this case, a server certificate may be used for a server authentication, and a client certificate may be used for a client authentication.

In case of a remote configuration mode or a manual log-in, when the credential information is entered by an authorized personnel on site to trigger the remote bootstrapping, the charging station 102 or 104 uses a secure channel, i.e., HTTPS, to connect to the bootstrapping server. At this time, a server SSL certificate may be used for the server authentication and the HTTP basic authentication method (i.e., ID and password) may be used for the client authentication according to RFC7235 standard. Alternatively, the ID and password based connection method provided by the XMPP protocol may be used for the both authentication.

After the charging station 102 or 104 is successfully connected to the CSMS 210 in the operation 410, the charging station 102 or 104 provides the CSMS 210 with at least some of the bootstrap information necessary for a proper management of the charging station as the registration information in the operation 420, so that the charging station 102 or 104 is registered with the CSMS 210. When the charging station 102 or 104 is registered with the CSMS 210, a common procedure may be performed regardless of the configuration mode and the connection method. The information registered with the CSMS 210 includes the identity information of charging station including the physical identity information and logical identity information of the charging station, the identity information of the EVSEs under the charging station including physical EVSE identities (e.g., the serial number) and the logical EVSE identities (e.g., EVSEID), the capabilities information of the charging station (e.g., the model number, a set of capabilities attributes such as AC, DC, WPT, BPT, dynamic, ACD, and so on, and a set of capabilities of each EVSE), and the other information related to the operation of the charging station.

Figure 6:
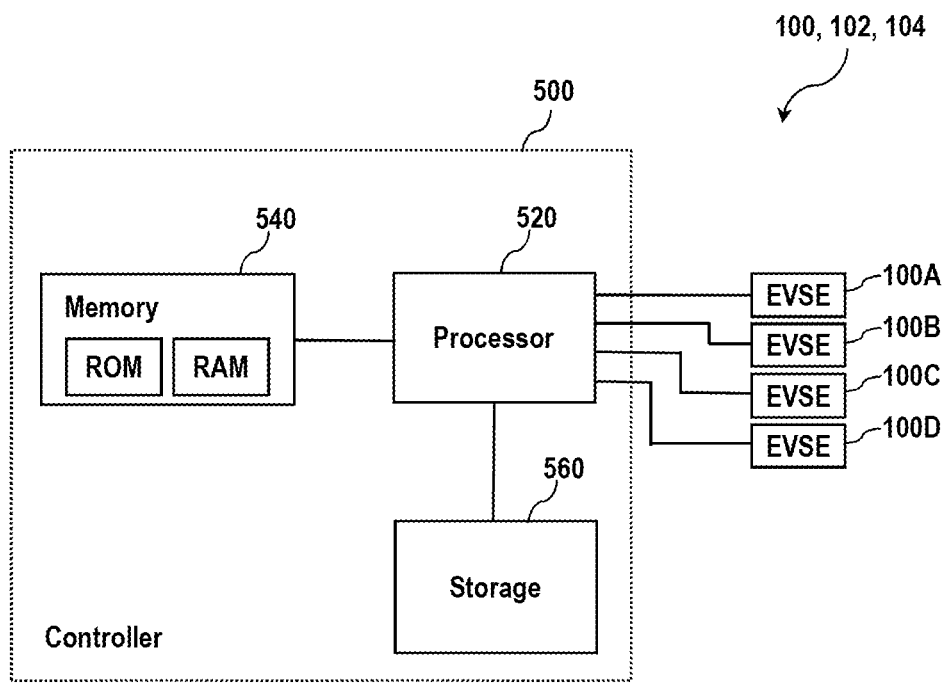
FIG. 6 is a block diagram of a charging station according to an exemplary embodiment of the present disclosure.

FIG. 6 is a block diagram of any of the CSs 100, 102, and 104 according to an exemplary embodiment of the present disclosure.

Referring to FIG. 6, any of the CSs, e.g. the CS 102, according to an exemplary embodiment of the present disclosure includes a controller 500 and a plurality of EVSEs 100A-100D. The controller 500 may include at least one processor 520, a memory 540, and a storage 560, and controls an overall operation of the CS 102. In particular, the controller 500 performs processes for which the CS 102 is responsible during the bootstrapping operation.

The processor 520 may execute program instructions stored in the memory 540 and/or the storage 560. The processor 520 may be at least one central processing unit (CPU), a graphics processing unit (GPU), or any other kind of dedicated processor suitable for performing the processes according to the present disclosure.

The memory 540 may include, for example, a volatile memory such as a read only memory (ROM) and a non-volatile memory such as a random access memory (RAM).

The memory 540 may load the program instructions stored in the storage 560 to provide to the processor 520.

The storage 560 may include an intangible recording medium suitable for storing the program instructions and data files. Any device capable of storing data that may be readable by a computer system may be used for the storage. Examples of the storage medium may include magnetic media such as a hard disk, a floppy disk, and a magnetic tape, optical media such as a compact disk read only memory (CD-ROM) and a digital video disk (DVD), mag-neto-optical medium such as a floptical disk, and semiconductor memories such as ROM, RAM, a flash memory, and a solid-state drive (SSD).

The storage 560 stores the program instructions. In particular, the program instructions may include program instructions for implementing the bootstrapping process according to the present disclosure. The program instructions for the bootstrapping process includes instructions causing the processor to configure bootstrap information by storing at least some of the bootstrap information in the memory, establish a secure channel to the CSMS in which registration information for the charging station apparatus is to be maintained and connect the charging station apparatus to the CSMS, and register the charging station apparatus with the CSMS. Such program instructions may be loaded into the memory 540 under a control of the processor 520 and then executed by the processor 520 to implement the method according to the present disclosure.

The apparatus and method according to exemplary embodiments of the present disclosure can be implemented by computer-readable program codes or instructions stored on a computer-readable intangible recording medium. The computer-readable recording medium includes all types of recording device storing data which can be read by a computer system. The computer-readable recording medium may be distributed over computer systems connected through a network so that the computer-readable program or codes may be stored and executed in a distributed manner.

The computer-readable recording medium may include a hardware device specially configured to store and execute program instructions, such as a ROM, RAM, and flash memory. The program instructions may include not only machine language codes generated by a compiler, but also high-level language codes executable by a computer using an interpreter or the like.

Some aspects of the present disclosure described above in the context of the apparatus may indicate corresponding descriptions of the method according to the present disclosure, and the blocks or devices may correspond to operations of the method or features of the operations. Similarly, some aspects described in the context of the method may be expressed by features of blocks, items, or devices corresponding thereto. Some or all of the operations of the method may be performed by use of a hardware device such as a microprocessor, a programmable computer, or electronic circuits, for example. In some exemplary embodiments, one or more of the most important operations of the method may be performed by such a device.

In some exemplary embodiments, a programmable logic device such as a field-programmable gate array may be used to perform some or all of the functions of the methods described herein. The field-programmable gate array may be operated along with a microprocessor to perform one of the methods described herein. In general, the methods may be performed preferably by a certain hardware device.

While the present disclosure has been described above with respect to exemplary embodiments thereof, it will be apparent to those skilled in the art that various changes and modifications may be made without departing from the spirit and scope of the present disclosure defined in the following claims.

What is claimed is:

1. A bootstrapping method for registering a charging station in an offline state with an electric vehicle charging station management system (CSMS) to enable the charging station to operate normally, comprising:

configuring, by the charging station, bootstrap information by storing at least some of the bootstrap information in the charging station;

establishing, by the charging station, a secure channel between the charging station and the CSMS to connect the charging station to the CSMS based on the bootstrap information stored in the charging station, wherein the CSMS is previously in the offline state with the charging station before the secure channel is established; and communicating, by the charging station with the CSMS, for the charging station to be registered with the CSMS.

2. The bootstrapping method of claim 1, wherein the bootstrap information comprises:

connection information to the CSMS associated with the charging station;

credential information for establishing the secure channel to the CSMS; and registration information of the charging station.

3. The bootstrapping method of claim 2, wherein the connection information includes at least one of an IP address and port number of the CSMS, or connection information needed to communicate with the CSMS according to a predetermined communication protocol.

4. The bootstrapping method of claim 3, wherein the predetermined communication protocol is an Extensible Messaging and Presence Protocol (XMPP), wherein the connection information needed to communicate with the CSMS includes an XMPP application identifier or subscription topics.

5. The bootstrapping method of claim 3, wherein the credential information includes at least one of:

a symmetric key shared in advance by the charging station and the CSMS or identification information that may be used to check a physical or logical identity of the charging station; or a public key certificate chain including a public key issued to the charging station.

6. The bootstrapping method of claim 1, wherein configuring the bootstrap information is performed in at least one of three modes:

a factory configuration mode in which the bootstrap information is stored in the charging station in a predetermined factory;

an on-site configuration mode in which the bootstrap information is stored in the charging station in an installation site by using a storage medium; or a remote configuration mode in which the bootstrap information is stored in the charging station through a predetermined communication network from a bootstrapping server located in a remote site.

7. The bootstrapping method of claim 6, wherein configuring the bootstrap information in the remote configuration mode comprises:

installing predetermined bootstrap trigger information in the charging station according to any of the factory configuration mode, the on-site configuration mode, and a combination thereof; and downloading the bootstrap information from the bootstrapping server based on the bootstrap trigger information installed in the charging station.

8. The bootstrapping method of claim 6, wherein downloading the bootstrap information comprises:

establishing a secure channel between the charging station and the bootstrapping server in a same manner as establishing the secure channel between the charging station and the CSMS to register the registration information of the charging station.

9. The bootstrapping method of claim 1, wherein establishing the secure channel between the charging station and the CSMS and connecting the charging station to the CSMS comprises:

establishing the secure channel by using a transport layer security-pre-shared key (TLS-PSK) cypher suite when a credential available to the charging station is a pre-shared symmetric key (PSK) shared with the CSMS, and establishing the secure channel by using a transport layer security method with mutual authentication or a certificate-based connection method when the credential available to the charging station is a predetermined certificate chain.

10. The bootstrapping method of claim 1, wherein registering the charging station with the CSMS comprises:

transmitting the registration information including identity information of the charging station, identity information of an EVSE included in or connected to the charging station, and capability information of the charging station to the CSMS.

11. A charging station apparatus capable of being registered with a charging station management system (CSMS) through a predetermined bootstrapping procedure in an offline state to be operable to charge an electric vehicle, comprising:

a processor executing at least one program instruction, wherein the processor is configured to:

configure bootstrap information by storing at least some of the bootstrap information in the charging station apparatus;

establish a secure channel between the CSMS and the charging station apparatus to connect the charging station apparatus to the CSMS based on the bootstrap information stored in the charging station apparatus, wherein the CSMS is previously in the offline state with the charging apparatus before the secure channel is established; and communicate with the CSMS for the charging station apparatus to be registered with the CSMS.

12. The charging station apparatus of claim 11, wherein the bootstrap information comprises:

connection information to the CSMS associated with the charging station apparatus;

credential information for establishing the secure channel to the CSMS; and registration information of the charging station apparatus.

13. The charging station apparatus of claim 12, wherein the connection information includes at least one of an IP address and port number of the CSMS, or connection information needed to communicate with the CSMS according to a predetermined communication protocol.

14. The charging station apparatus of claim 13, wherein the predetermined communication protocol is an Extensible Messaging and Presence Protocol (XMPP), wherein the connection information needed to communicate with the CSMS includes an XMPP application identifier or subscription topics.

15. The charging station apparatus of claim 13, wherein the credential information includes at least one of:

a symmetric key shared in advance by the charging station apparatus and the CSMS or identification information that may be used to check a physical or logical identity of the charging station apparatus; or a public key certificate chain including a public key issued to the charging station apparatus.

16. The charging station apparatus of claim 11, wherein the program instructions causing the processor to configure the bootstrap comprises instructions causing the processor to perform at least one of three modes:

a factory configuration mode in which the bootstrap information is stored in the charging station apparatus in a predetermined factory;

an on-site configuration mode in which the bootstrap information is stored in the charging station apparatus in an installation site by using a storage medium; or a remote configuration mode in which the bootstrap information is stored in the charging station apparatus through a predetermined communication network from a bootstrapping server located in a remote site.

17. The charging station apparatus of claim 16, wherein the program instructions causing the processor to configure the bootstrap information in the remote configuration mode comprises instructions causing the processor to:

install predetermined bootstrap trigger information in the charging station according to any of the factory configuration mode, the on-site configuration mode, and a combination thereof; and download the bootstrap information from the bootstrapping server based on the bootstrap trigger information.

18. The charging station apparatus of claim 17, wherein the program instructions causing the processor to download the bootstrap information comprises instructions causing the processor to:

establish a secure channel to the bootstrapping server in a same manner as establishing the secure channel to the CSMS to register the registration information.

19. The charging station apparatus of claim 11, wherein the program instructions causing the processor to establish the secure channel to the CSMS and connect the charging station apparatus to the CSMS comprises instructions causing the processor to:

establish the secure channel by using a transport layer security-pre-shared key (TLS-PSK) cypher suite when an available credential is a pre-shared symmetric key (PSK) shared with the CSMS, and establish the secure channel by using a transport layer security method with mutual authentication or a certificate-based connection method when the available credential is a predetermined certificate chain.

20. The charging station apparatus of claim 11, wherein the program instructions causing the processor to register the charging station apparatus with the CSMS comprises instructions causing the processor to:

send the registration information including identity information of the charging station apparatus, identity information of an EVSE included in or connected to the charging station apparatus, and capability information of the charging station apparatus to the CSMS.

\* \* \* \* \*